(12) United States Patent
Milanfar et al.

(10) Patent No.: US 7,412,107 B2
(45) Date of Patent: Aug. 12, 2008

(54) SYSTEM AND METHOD FOR ROBUST MULTI-FRAME DEMOSAICING AND COLOR SUPER-RESOLUTION

(75) Inventors: Peyman Milanfar, Menlo Park, CA (US); Sina Farsiu, Santa Cruz, CA (US); Michael Elad, Halfa (IL)

(73) Assignee: The Regents of the University of California, Santa Cruz, Oakland, CA (US)

( * ) Notice: Subject to any disclaimer, the term of this patent is extended or adjusted under 35 U.S.C. 154(b) by 146 days.

(21) Appl. No.: 11/301,811

(22) Filed: Dec. 12, 2005

(65) Prior Publication Data
US 2006/0290711 A1 Dec. 28, 2006

Related U.S. Application Data

(60) Provisional application No. 60/636,891, filed on Dec. 17, 2004.

(51) Int. Cl.
*G06K 9/40* (2006.01)
(52) U.S. Cl. .......................... 382/254; 382/300; 382/263; 345/606
(58) Field of Classification Search ................. 345/606; 382/254, 284, 300, 263, 167
See application file for complete search history.

(56) References Cited

U.S. PATENT DOCUMENTS 6,452,637 B1 * 9/2002 Rudin et al. ............. 348/416.1

2002/0114532 A1 * 8/2002 Ratner et al. ................ 382/266

* cited by examiner

*Primary Examiner*—Kee M. Tung
*Assistant Examiner*—Kevin K Xu
(74) *Attorney, Agent, or Firm*—Lumen Patent Firm, Inc.

(57) ABSTRACT

An integrated method for both super-resolution and multi-frame demosaicing includes an image fusion followed by simultaneous deblurring and interpolation. For the case of color super-resolution, the first step involves application of recursive image fusion separately on the three different color layers. The second step is based on minimizing a maximum a posteriori (MAP) cost function. In one embodiment, the MAP cost function is composed of several terms: a data fidelity penalty term that penalizes dissimilarity between the raw data and the super-resolved estimate, a luminance penalty term that favors sharp edges in the luminance component of the image, a chrominance penalty term that favors low spatial frequency changes in the chrominance component of the image, and an orientation penalty term that favors similar edge orientations across the color channels. The method is also applicable to color super-resolution (without demosaicing), where the low-quality input images are already demosaiced. In addition, for translational motion, the method may be used in a very fast image fusion algorithm to facilitate the implementation of dynamic, multi-input/multi-output color super-resolution/demosaicing.

1 Claim, No Drawings

SYSTEM AND METHOD FOR ROBUST MULTI-FRAME DEMOSAICING AND COLOR SUPER-RESOLUTION

CROSS-REFERENCE TO RELATED APPLICATIONS

This application claims priority from U.S. provisional patent application No. 60/636891 filed Dec. 17, 2004, which is incorporated herein by reference.

STATEMENT OF GOVERNMENT SPONSORED SUPPORT

This invention was supported in part by the National Science Foundation under grant number CCR-9984246. The U.S. Government may have certain rights in the invention.

FIELD OF THE INVENTION

This invention relates generally to high resolution image restoration and reconstruction. More particularly, it relates to a method for enhancing the quality of a set of noisy, blurred, and/or color-filtered low-resolution images to produce one or a set of full color high-resolution images with low noise, blur, and color artifacts.

BACKGROUND OF THE INVENTION

Super-resolution image reconstruction is a kind of digial image processing that increases the resolvable detail in images. The earliest techniques for super-resolution generated a still image of a scene from a collection of similar lower-resolution images of the same scene. For example, several frames of low-resolution video may be combined using super-resolution techniques to produce a single still image whose resolution is significantly higher than that of any single frame of the original video. Because each low-resolution frame is slightly different and contributes some unique information that is absent from the other frames, the reconstructed still image has more information, i.e., higher resolution, than that of any one of the originals alone. Super-resolution techniques have many applications in diverse areas such as medical imaging, remote sensing, surveillance, still photography, and motion pictures.

The details of how to reconstruct the best high-resolution image from multiple low-resolution images is a complicated problem that has been an active topic of research for many years, and many different techniques have been proposed. One reason the super-resolution reconstruction problem is so challenging is because the reconstruction process is, in mathematical terms, an under-constrained inverse problem. In the mathematical formulation of the problem, the known low-resolution images are represented as resulting from a transformation of the unknown high-resolution image by effects of image warping due to motion, optical blurring, sampling, and noise. When the model is inverted, the original set of low-resolution images does not, in general, determine a single high-resolution image as a unique solution. Moreover, in cases where a unique solution is determined, it is not stable, i.e., small noise perturbations in the images can result in large differences in the super-resolved image. To address these problems, super-resolution techniques require the introduction of additional assumptions (e.g., assumptions about the nature of the noise, blur, or spatial movement present in the original images). Part of the challenge rests in selecting constraints that sufficiently restrict the solution space without an unacceptable increase in the computational complexity. Another challenge is to select constraints that properly restrict the solution space to good high-resolution images for a wide variety of input image data. For example, constraints that are selected to produce optimal results for a restricted class of image data (e.g., images limited to pure translational movement between frames and common space-invariant blur) may produce significantly degraded results for images that deviate even slightly from the restricted class. In summary, super-resolution techniques should be computationally efficient and produce desired improvements in image quality that are robust to variations in the properties of input image data.

It is significant to note that most prior super-resolution techniques have been limited to monochromatic images. Color super-resolution, however, involves additional challenges due to the color mosaic nature of most color images. Instead of using a full RGB sensor array that measures all three RGB values at each pixel, most sensors measure one R, G, or B value at each pixel of the array, resulting in a color mosaic of separated R, G, and B pixels. In a process known as demosaicing, the missing colors at each pixel are synthesized using some form of interpolation of colors from neighboring pixels. Most demosaicing techniques, however, produce images with color artifacts. When a set of such demosaiced low-resolution color images are used to reconstruct a super-resolved color image, the artifacts result in reduced quality. To avoid these problems, an alternative approach would be to use color information from multiple frames to decrease color artifacts. Due to movement between frames, such multi-frame demosaicing introduces complicated issues not present in the single-frame demosaicing problem.

SUMMARY OF THE INVENTION

This invention implements an algorithm to enhance the quality of a set of noisy, blurred, and/or color-filtered low-resolution images to produce one or a set of full-color high-resolution images with low noise, blur, and color artifacts. Existing multi-frame demosaicing techniques often involve assumptions that are not valid for general image data. Moreover, when followed by super-resolution, the optimal results are not obtained from these techniques because the demosaicing and super-resolution steps are performed independently. Accordingly, in one aspect, the present invention provides an integrated method that combines both super-resolution and multi-frame demosaicing into a single technique. Previously, these problems were usually solved independently. The method may be implemented as a two-step process of image fusion followed by simultaneous deblurring and interpolation. For the case of color super-resolution, the first step involves application of recursive image fusion separately on the three different color layers. The second step is based on minimizing a maximum a posteriori (MAP) cost function. In one embodiment, the MAP cost function is composed of several terms: a data fidelity penalty term that penalizes dissimilarity between the raw data and the super-resolved estimate, a luminance penalty term that uses a bilateral total variation regularization method to favor sharp edges and other high spatial frequency changes in the luminance component of the image, a chrominance penalty term that favors low spatial frequency changes in the chrominance component of the image using an $L_2$ regularization to more aggressively smooth chrominance, and an orientation penalty term that favors similar edge orientations across the color channels. Steepest descent optimization may be used to minimize the MAP cost function.

This algorithm is also applicable to color super-resolution (without demosaicing), where the low-quality input images are already demosaiced by a conventional, non-ideal method. In addition, for translational motion, the invention further employs a very fast image fusion algorithm to facilitate the implementation of dynamic, multi-input/multi-output color super-resolution/demosaicing algorithms in an extremely fast and memory efficient way.

DETAILED DESCRIPTION

Details of various embodiments of the present invention are disclosed in the following appendices:

Appendix A: Sina Farsiu, "First Report on Combining Demosaicing and Super-Resolution Methods," 8 pages.

Appendix B: Sina Farsiu, Michael Elad, Peyman Milanfar "Multi-Frame Demosaicing and Super-Resolution from Under-Sampled Color Images" Proceedings, IS&T/SPIE Symposium, Electronic Imaging 2004, January 2004, San Jose, Calif., 12 pages.

Appendix C: Sina Farsiu, Dirk Robinson, Michael Elad, Peyman Milanfar "Advances and Challenges in Super-Resolution" March 2004, 27 pages.

Appendix D: Sina Farsiu, Dirk Robinson, Michael Elad, Peyman Milanfar "Dynamic Demosaicing and Color Super-Resolution of Video Sequences," 8 pages.

Appendix E: Sina Farsiu "Fast and Robust Solutions to Imaging Inverse Problems with Varying Forward Models," May 2003, 20 pages.

As one of ordinary skill in the art will appreciate, various changes, substitutions, and alterations could be made or otherwise implemented without departing from the principles of the present invention. Accordingly, the examples and drawings disclosed herein including the appendix are for purposes of illustrating the preferred embodiments of the present invention and are not to be construed as limiting the invention.

The invention claimed is:

1. A computer-implemented method for color super-resolution comprising:

computing a super-resolved color image from a plurality of lower-resolution color images by performing image fusion followed by combined deblurring and color interpolation, wherein the combined deblurring and color interpolation comprises minimizing a maximum a posteriori (MAP) cost function composed of a data fidelity penalty term, a luminance penalty term, a chrominance penalty term, and an orientation penalty term.

* * * * *